United States Patent
Kang et al.

(10) Patent No.: US 10,399,855 B2
(45) Date of Patent: Sep. 3, 2019

(54) CARBON NANOTUBES HAVING LARGER DIAMETER AND LOWER BULK DENSITY AND PROCESS FOR PREPARING SAME

(71) Applicant: LG CHEM, LTD., Seoul (KR)

(72) Inventors: KyungYeon Kang, Daejeon (KR); DongHyun Cho, Daejeon (KR); SungJin Kim, Daejeon (KR); Seungyong Lee, Daejeon (KR); Jihee Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/123,180

(22) PCT Filed: Feb. 26, 2016

(86) PCT No.: PCT/KR2016/001894
§ 371 (c)(1),
(2) Date: Sep. 1, 2016

(87) PCT Pub. No.: WO2016/171386
PCT Pub. Date: Oct. 27, 2016

(65) Prior Publication Data
US 2018/0162734 A1    Jun. 14, 2018

(30) Foreign Application Priority Data

Apr. 21, 2015    (KR) .................. 10-2015-0055635

(51) Int. Cl.
*C01B 32/162* (2017.01)
*C01B 32/05* (2017.01)
(Continued)

(52) U.S. Cl.
CPC ............. *C01B 32/162* (2017.08); *B01J 6/004* (2013.01); *B01J 21/04* (2013.01); *B01J 37/0205* (2013.01);
(Continued)

(58) Field of Classification Search
CPC ... C01B 32/162; C01B 32/05; C01B 2202/32; B82Y 30/00; B82Y 40/00; B01J 6/004;
(Continued)

(56) References Cited

U.S. PATENT DOCUMENTS

| 7,988,861 B2 * | 8/2011 | Pham-Huu ............... B01J 20/20 210/192 |
| 9,399,578 B2 * | 7/2016 | Kang ....................... B01J 23/75 |

(Continued)

FOREIGN PATENT DOCUMENTS

| CN | 101848959 A | 9/2010 |
| CN | 103987659 A | 8/2014 |

(Continued)

OTHER PUBLICATIONS

Chai, et al.: "The effect of catalyst calcination temperature on the diameter of carbon nanotubes synthesized by the decomposition of methane", Carbon, ScienceDirect, Elsevier, vol. 45, 2007, pp. 1535-1541.

(Continued)

*Primary Examiner* — Richard M Rump
(74) *Attorney, Agent, or Firm* — Dentons US LLP

(57) ABSTRACT

The present invention relates to a method for producing large-diameter, low-density carbon nanotubes. The method uses a catalyst containing spherical α-alumina that is capable of controlling the growth of carbon nanotubes without deteriorating the quality of the carbon nanotubes. The use of the catalyst makes the carbon nanotubes highly dispersible.

15 Claims, 9 Drawing Sheets

(51) Int. Cl.
*B01J 6/00* (2006.01)
*B01J 21/04* (2006.01)
*B01J 37/02* (2006.01)

(52) U.S. Cl.
CPC ......... *C01B 32/05* (2017.08); *B01J 2523/842* (2013.01); *B01J 2523/845* (2013.01); *B01J 2523/847* (2013.01); *C01B 2202/32* (2013.01); *C01P 2006/12* (2013.01)

(58) Field of Classification Search
CPC .. B01J 21/04; B01J 37/0205; B01J 2523/842; B01J 2523/845; B01J 2523/847; C01P 2006/12
See application file for complete search history.

(56) References Cited

U.S. PATENT DOCUMENTS

| | | | |
|---|---|---|---|
| 9,434,617 | B2 | 9/2016 | Kang et al. |
| 9,809,458 | B2 | 11/2017 | Kim et al. |
| 2004/0150312 | A1* | 8/2004 | McElrath ............... C01B 32/168 313/310 |
| 2005/0002851 | A1 | 1/2005 | McElrath et al. |
| 2014/0012034 | A1* | 1/2014 | Shaffer ................ B01J 13/0091 560/56 |
| 2015/0238950 | A1* | 8/2015 | Kim ........................ B01J 21/04 428/403 |
| 2015/0298974 | A1* | 10/2015 | Kim ....................... B01J 23/745 423/447.2 |

FOREIGN PATENT DOCUMENTS

| | | |
|---|---|---|
| JP | 2006298713 A | 11/2006 |
| JP | 2008528436 A | 7/2008 |
| JP | 2014521589 A | 8/2014 |
| KR | 10-2013-0082460 A | 7/2013 |
| KR | 10-2015-0010607 A | 1/2015 |
| KR | 10-2015-0037601 A | 4/2015 |
| WO | 2016126133 A1 | 8/2016 |

OTHER PUBLICATIONS

Rummeli, et al.: "Investigating the Outskirts of Fe and Co Catalyst Particles in Alumina-Supported Catalytic CVD Carbon Nanotube Growth", American Chemical Society (ACS) Nano, vol. 4, No. 2, 2010, pp. 1146-1152.

Fazle Kibria, et al.: "Synthesis of carbon nanotubes over nickel-iron catalysts supported on alumina under controlled conditions", Catalysis Letters, Plenum Publishing Corporation, vol. 71, No. 3-4, 2001, pp. 229-236.

Nakayama et al., "Effect of Support Particle Morphology of Ni Catalysts on Growth of Carbon Nanotubes by Methane Decomposition", Journal of the Japan Petroleum Institute, 2006, vol. 49, pp. 308-314.

* cited by examiner

CARBON NANOTUBES HAVING LARGER DIAMETER AND LOWER BULK DENSITY AND PROCESS FOR PREPARING SAME

This application is a National Stage Entry of International Application No. PCT/KR2016/001894, filed on Feb. 26, 2016, and claims the benefit of and priority to Korean Application No. 10-2015-0055635, filed on Apr. 21, 2015, all of which are hereby incorporated by reference in their entirety for all purposes as if fully set forth herein.

BACKGROUND OF THE INVENTION

1. Field of the Invention

The present invention relates to carbon nanotubes that are advantageous in dispersion due to their small specific surface area and low bulk density, and a method for producing the carbon nanotubes.

2. Description of the Related Art

Generally, carbon nanotubes (CNTs) refer to cylindrical carbon tubes whose diameter is from about 3 to about 150 nm, specifically from about 3 to about 100 nm, and whose length is several times, for example, at least 100 times, greater than their diameter. Such CNTs consist of layers of ordered carbon atoms and have cores with different shapes. CNTs are also called, for example, "carbon fibrils" or "hollow carbon fibers".

CNTs are of industrial importance in the manufacture of composites because of their size and specific physical properties. CNTs can find widespread applications in numerous fields, including electronic materials and energy materials.

CNTs can be produced by general techniques, such as arc discharge, laser ablation, and chemical vapor deposition. However, arc discharge and laser ablation are not appropriate for mass production of CNTs and require high arc production costs or expensive laser equipment, which is disadvantageous from an economic viewpoint.

Chemical vapor deposition using a vapor dispersion catalyst has the problems of a very low synthesis rate and too small a size of final CNT particles. Chemical vapor deposition using a substrate-supported catalyst suffers from very low efficiency in the utilization of a reactor space, thus being inappropriate for mass production of CNTs.

Catalytically active components of the catalysts usually take the form of oxides, partially or completely reduced products, or hydroxides. The catalysts may be, for example, carbon nanotube catalysts or coprecipitated catalysts, which can be commonly used for CNT production. Carbon nanotube catalysts are preferably used for the following reasons: carbon nanotube catalysts have a higher inherent bulk density than coprecipitated catalysts; unlike coprecipitated catalysts, carbon nanotube catalysts produce a small amount of a fine powder with a size of 10 microns or less, which reduces the possibility of occurrence of a fine powder due to attrition during fluidization; and high mechanical strength of carbon nanotube catalysts effectively stabilizes the operation of reactors.

Many methods have been proposed to prepare carbon nanotube catalysts. For example, impregnation methods are known in which an aqueous metal solution is mixed with a support, followed by coating and drying. A porous structure is mainly used as the support. However, catalysts prepared by the impregnation methods are not suitable for use in the synthesis of CNTs with controlled diameter. This problem is usually solved by a high reaction temperature for chemical vapor deposition. In this case, however, the high reaction temperature increases the formation of amorphous carbonaceous materials. Thus, high-temperature annealing is additionally needed to crystallize the amorphous carbonaceous materials.

SUMMARY OF THE INVENTION

An object of the present invention is to provide highly dispersible, large-diameter, low-density CNTs.

A further object of the present invention is to provide a method for producing CNTs with controlled diameter in which the formation of amorphous carbon is suppressed during CNT synthesis.

One aspect of the present invention provides carbon nanotubes grown on a supported catalyst in which a catalytic component and an active component are supported on a spherical α-alumina support and having a BET specific surface area of 40 $m^2/g$ to 120 $m^2/g$ and a bulk density not higher than 60 $kg/m^3$.

The carbon nanotubes may have a potato-like or spherical entangled type secondary structure.

A further aspect of the present invention provides a method for producing carbon nanotubes, including: feeding a supported catalyst in which a catalytic component and an active component are supported on a spherical α-alumina support and prepared by calcination at 600° C. or less into a reactor and injecting a carbon source and optionally hydrogen gas, nitrogen gas or a mixed gas thereof into the reactor at a temperature of 650° C. to less than 800° C.; and decomposing the injected carbon source on the surface of the catalyst to grow carbon nanotubes thereon.

Conventional methods for CNT production have difficulty in controlling the diameter of CNTs. In contrast, the method of the present invention enables the production of CNTs with controlled diameter and low bulk density. The low bulk density ensures improved dispersibility of CNTs. In addition, the method of the present invention minimizes the formation of amorphous carbon during production of CNTs.

DETAILED DESCRIPTION OF THE INVENTION

Figure 1:
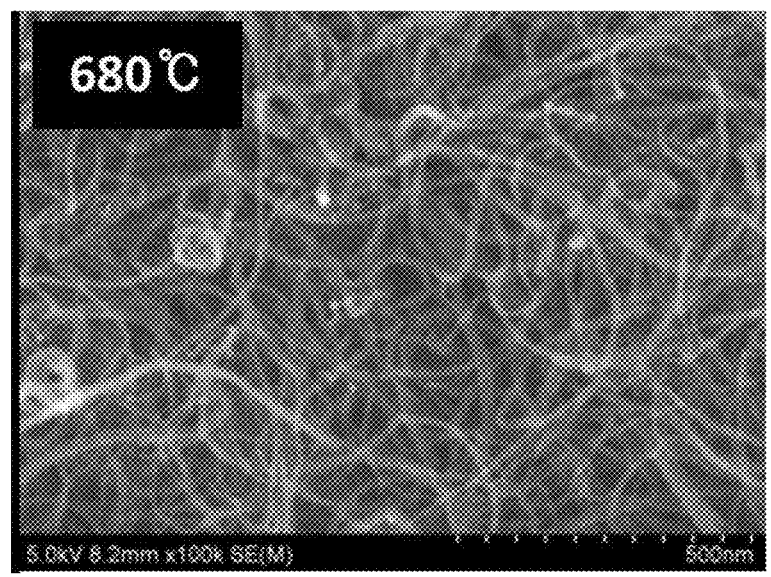
FIGS. 1 to 5 show high magnification (100,000×) SEM images of CNTs produced using supported catalysts obtained in Comparative Examples 1 to 3 and Examples 1 and 2, respectively.
Figure 2:
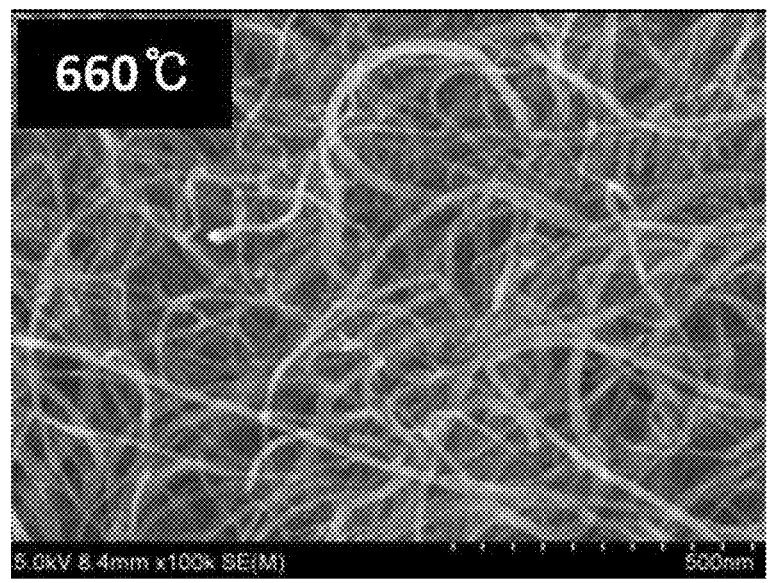
Figure 3:
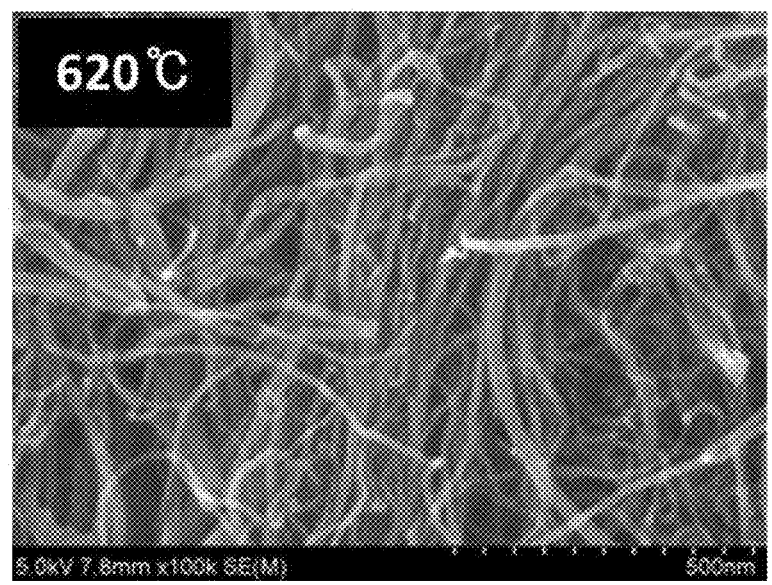
Figure 4:
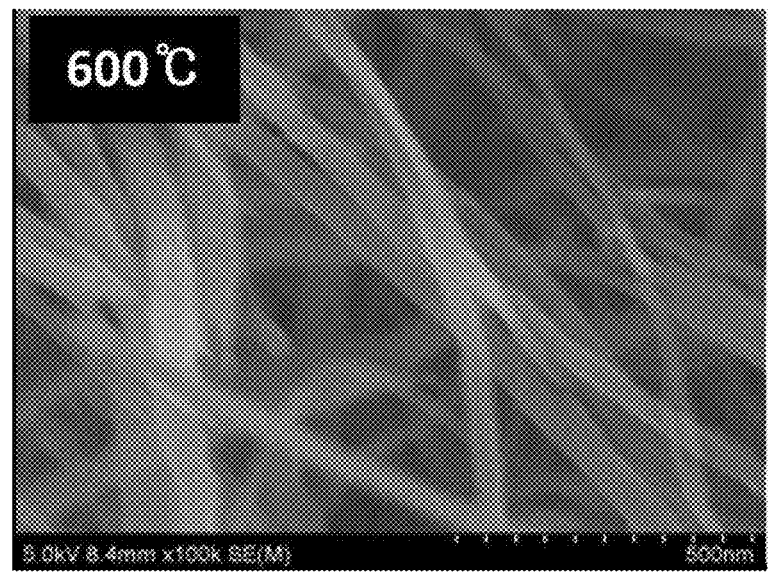
Figure 5:
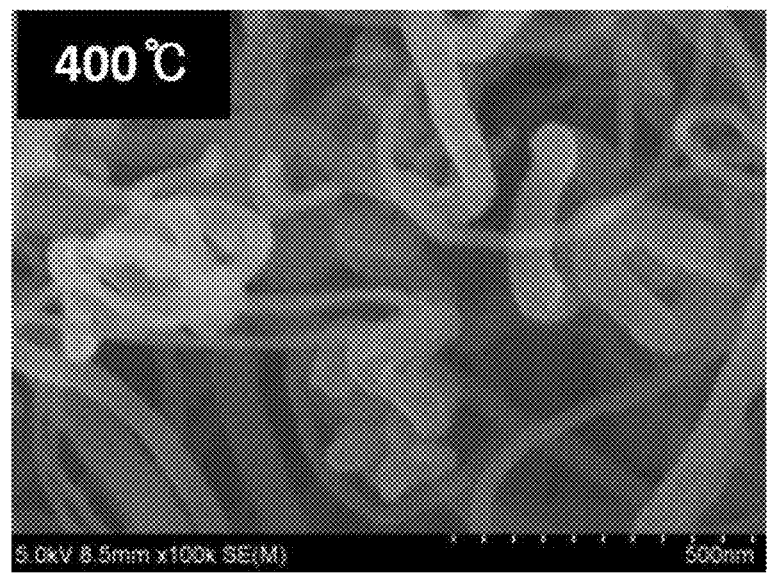
Figure 6:
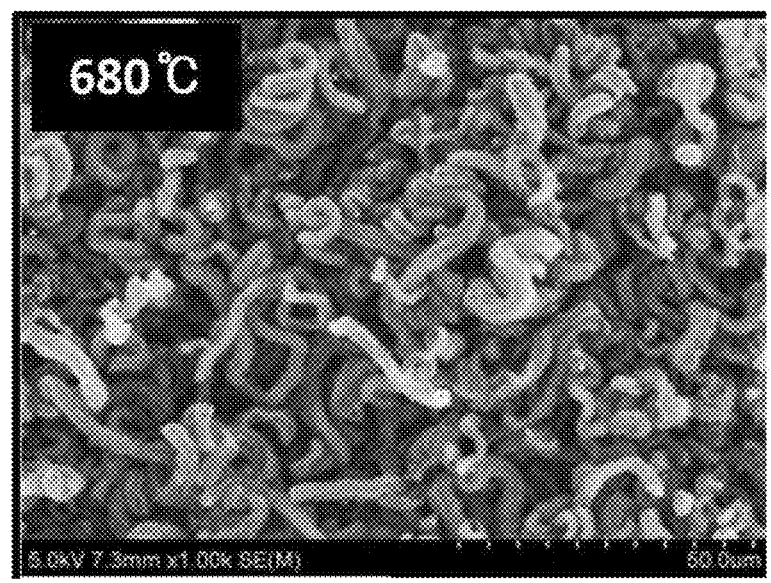
FIGS. 6 to 10 show medium magnification (1,000×) SEM images of CNTs produced using supported catalysts obtained in Comparative Examples 1 to 3 and Examples 1 and 2, respectively.
Figure 7:
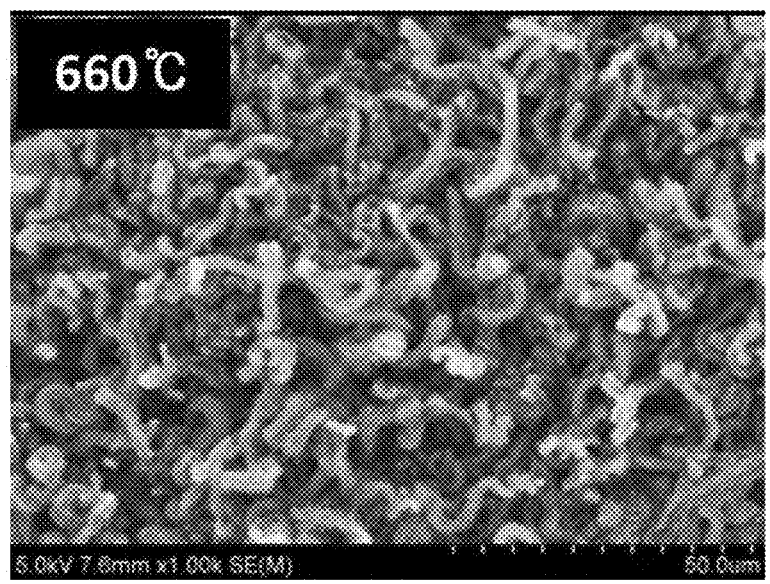
Figure 8:
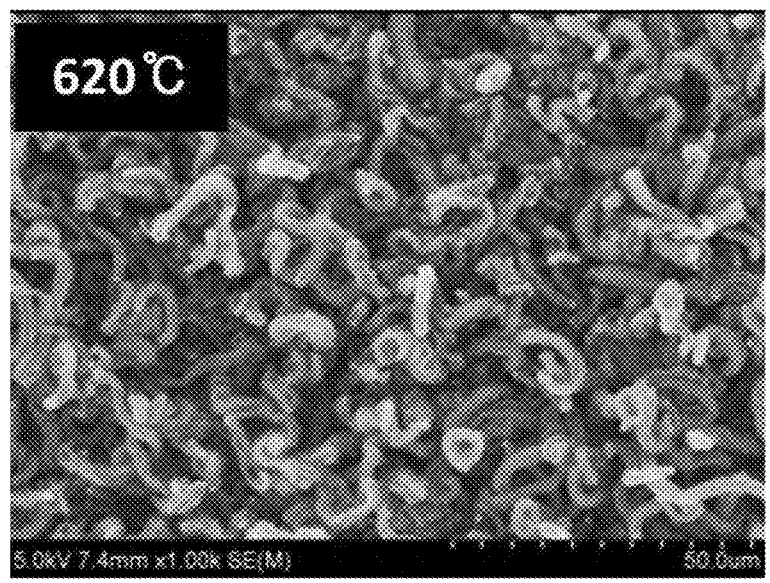
Figure 9:
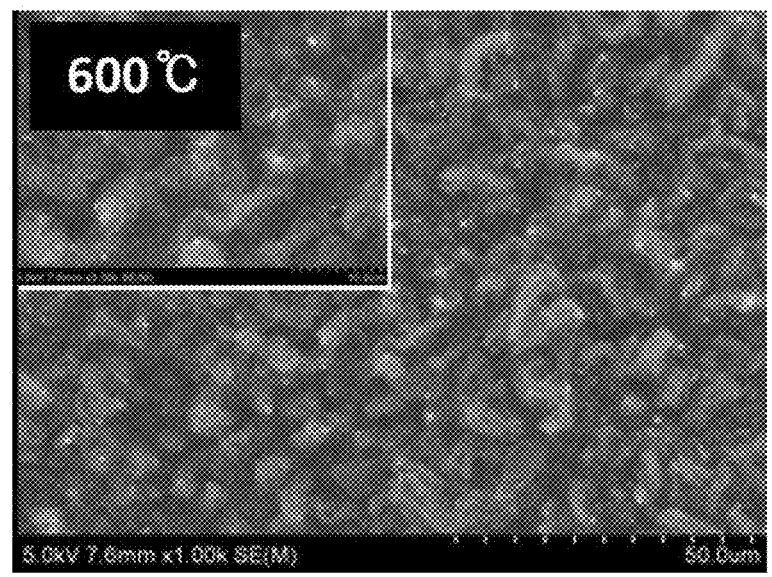
Figure 10:
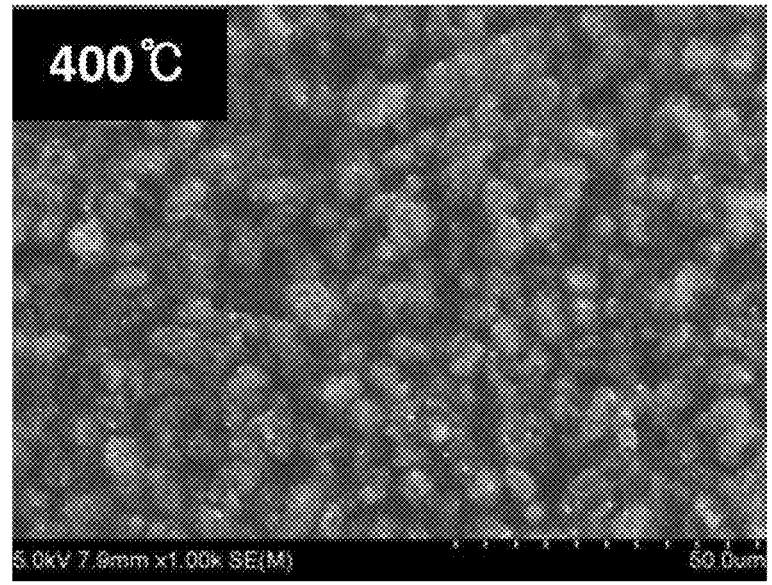

It should be understood that the terms and words used in the specification and claims are not to be construed as having common and dictionary meanings, but are construed as having meanings and concepts corresponding to the spirit of the invention in view of the principle that the inventor can define properly the concept of the terms and words in order to describe his/her invention with the best method.

The present invention will now be described in detail.

A preferred embodiment of the present invention provides a method for producing CNTs, including: feeding a supported catalyst in which a catalytic component and an active component are supported on a spherical α-alumina support and prepared by calcination at 600° C. or less into a reactor and injecting a carbon source and optionally hydrogen gas, nitrogen gas or a mixed gas thereof into the reactor at a temperature of 650° C. to less than 800° C.; and decomposing the injected carbon source on the surface of the catalyst to grow carbon nanotubes thereon.

According to the method of the present invention, the use of the α-alumina support and the control over the calcination and reaction temperatures enable the production of large-diameter, low-density CNTs that have a BET specific surface area as low as 40 m$^2$/g to 120 m$^2$/g and that have a bulk density of 60 kg/m$^3$ or less and are thus highly dispersible.

As described above, the supported catalyst includes a catalytic component and an active component supported on the spherical α-alumina support and is prepared by calcination at 600° C. or less.

Generally, alumina has the chemical formula $Al_2O_3$ and exists in several different phases, for example, α-, γ-, δ-, η-, θ-, and X-alumina. In α-alumina (corundum), the oxide ions form a hexagonal close-packed structure and the alumina ions are symmetrically distributed among the octahedral sites. Likewise, γ-alumina has a "defect" spinel structure with cation vacancies.

In one embodiment of the present invention, the support of the catalyst may include α-alumina. It is known that γ-alumina is very suitable for use as a catalyst support due to its high porosity while α-alumina is seldom utilized as a catalyst support due to its very low porosity. It was surprisingly found that when a supported catalyst using spherical α-alumina as a support is prepared by calcination at a controlled temperature and is used to produce CNTs, the formation of amorphous carbon is suppressed during CNT synthesis, and at the same time, the specific surface area of the CNTs is reduced, enabling control over the diameter of the CNTs.

As described above, the supported catalyst is characterized by the presence of a catalytic component and an active component supported on the spherical α-alumina support and the calcination temperature of 600° C. or less. For example, the calcination temperature may be in the range of 400° C. to 600° C. The supported catalyst prepared by calcination in the temperature range defined above reduces the specific surface area and bulk density of CNTs while minimizing the formation of amorphous carbon during CNT synthesis. The reduced specific surface area and bulk density ensure increased diameter of and improved dispersibility of CNTs, respectively.

As used herein, the term "spherical" in the spherical α-alumina is intended to include not only completely spherical but also substantially spherical shapes. This term may also include shapes whose cross-section is elliptical, like potato-like shapes.

According to one embodiment, the spherical α-alumina can be prepared by any suitable method known in the art. For example, the Bayer process for preparing alumina from bauxite is widely used in industrial applications. Likewise, the spherical α-alumina may be prepared by heating γ-$Al_2O_3$ or any hydrous oxide to a temperature exceeding 1000° C.

The spherical α-alumina support may have any suitable dimensions. For example, the spherical α-alumina may have a surface area of about 1 m$^2$/g to about 50 m$^2$/g, as measured by the BET method. The spherical α-alumina support has a very low porosity due to its smooth surface, unlike conventional supports. For example, the spherical α-alumina support may have a pore volume as low as 0.001 to 0.1 cm$^3$/g.

The spherical α-alumina support may be supported by relatively small amounts of metals. The metals may be, for example, a catalytic component and an active component and may be supported in a total amount of about 10 to about 25 parts by weight or about 15 to about 20 parts by weight, based on 100 parts by weight of the spherical α-alumina. When the total amount of the metals supported is within the range defined above, sufficient catalytic activity can be obtained.

The catalytic component and the active component supported on the spherical α-alumina may be used in a weight ratio ranging from 10-30:1-14. Within this range, better activity for CNT production can be exhibited.

The catalytic component may include at least one metal selected from the group consisting of Fe, Co, and Ni. For example, the catalytic component may be selected from the group consisting of Fe salts, Fe oxides, Fe compounds, Co salts, Co oxides, Co compounds, Ni salts, Ni oxides, Ni compounds, and mixtures thereof. As another example, the catalytic component may be nitrides such as $Fe(NO_3)_2 \cdot 6H_2O$, $Fe(NO_3)_2 \cdot 9H_2O$, $Ni(NO_3)_2 \cdot 6H_2O$, and $Co(NO_3)_2 \cdot 6H_2O$, etc.

The active component may include at least one metal selected from Mo and V. For example, the active component may be selected from the group consisting of Mo salts, Mo oxides, Mo compounds, V salts, V oxides, and V compounds. As another example, the active component may be $(NH_4)_6Mo_7O_{24} \cdot 4H_2O$, which may be dissolved in distilled water before use.

The supported catalyst for CNT synthesis may be prepared by an impregnation method.

One embodiment of the present invention provides a method for preparing a supported catalyst for CNT synthesis, including (1) mixing a spherical α-alumina support with an aqueous metal solution including a catalytic component precursor and an active component precursor to prepare an aqueous solution containing the supported catalyst precursors, (2) aging the aqueous solution containing the supported catalyst precursors and impregnating the catalytic component precursor and the active component precursor into the support to obtain a mixture, (3) drying the mixture under vacuum to coat the catalytic component and the active component on the surface of the support, and (4) calcining the vacuum-coated product at a temperature of 600° C. or less.

In step (1), an aqueous solution containing supported catalyst precursors is prepared. Specifically, the aqueous solution is prepared by mixing an Al-based support with an aqueous metal solution including a catalytic component precursor and an active component precursor. The catalytic component, the active component, and the spherical α-alumina support included in the aqueous solution are the same as those already described.

For example, the aqueous metal solution may have a concentration in the range of 0.1 to 0.4 g/ml or 0.1 to 0.3 g/ml. Within this range, high efficiency can be achieved in the subsequent impregnation step. For example, the spherical α-alumina support mixed with the aqueous metal solution may be used in such an amount that the catalytic component and the active component are supported in a total amount of about 10 to about 25 parts by weight or about 15 to about 20 parts by weight, based on 100 parts by weight of the spherical α-alumina, which has already been described.

In step (2), the aqueous solution containing the supported catalyst precursors is aged and the catalytic component precursor and the active component precursor are impregnated into the support to obtain a mixture. The aging/impregnation may be performed in the temperature range of 20 to 100° C. or 60 to 100° C. for 30 minutes to 15 hours or 1 to 15 hours, but is not limited to these conditions. Under the aging/impregnation conditions, high support efficiency can be provided.

In step (3), the mixture is dried under vacuum to coat the catalytic component and the active component on the surface of the support. The vacuum drying is performed by rotary evaporation under vacuum, for example, at 45° C. to 80° C. within 1 hour or for 1 minute to 1 hour. As a result of the drying, metal salts remaining unimpregnated into the support can be uniformly coated on the alumina surface.

The meaning of the term "vacuum" used in the vacuum drying is not particularly limited so long as the vacuum conditions correspond to those applied to known vacuum drying processes.

In step (4), the coated support obtained by the vacuum drying in step (3) is calcined to prepare the desired supported catalyst. The calcination may be performed in the temperature range of about 400 to about 600° C. in air or under an inert atmosphere. The calcination time may be from about 30 minutes to about 5 hours but is not limited thereto.

According to one embodiment, the method may further include preliminarily calcining the vacuum-dried mixture at about 250 to about 400° C. before the calcination in step (4). The preliminary calcination may be performed once or more. In this embodiment, a maximum of half of the aqueous solution containing the supported catalyst precursors is impregnated into the amorphous α-alumina support just before the preliminary calcination and the remainder of the aqueous solution containing the supported catalyst precursors is impregnated into the spherical α-alumina support immediately after the preliminary calcination or just before the calcination. This is preferred in terms of the efficiency of the reaction.

The bulk shape of the supported catalyst is not limited and depends on that of the spherical α-alumina support used. That is, the supported catalyst for CNT synthesis is spherical in bulk shape and may usually have a structure in which one or more layers of the catalytic component are coated on the surface of the support. The coating structure is preferably discrete rather than continuous in terms of CNT synthesis.

For example, the supported catalyst for CNT production may have a particle diameter (or an average particle diameter) of about 30 to about 150 μm. The supported catalyst may have a surface particle size in the range of about 10 to about 50 nm, as observed by SEM. This range is preferred in terms of CNT diameter control and catalytic activity.

When an ultrasonic powder is defined as a powder whose number average particle diameter is 32 μm or less taking the particle diameter or average particle diameter range of the alumina support into consideration, it may account for 5% or less (specifically 3% or less) of the supported catalyst in which the catalytic component and the active component are supported on the alumina support.

For reference, the ultrasonic powder refers to an aggregate of the catalytic material and the active material attached to the catalyst. The ultrasonic powder is not filtered out by sieving but is different in particle size and catalytic activity from the catalytic/active materials well-coated on the support. The ultrasonic powder is an island-type aggregate attached to the catalyst and causes considerably low CNT yield. Portions of the materials are slightly weakly attached to the catalyst, and as a result, they are detached from the catalyst to form a powder during ultrasonication.

The amount of the ultrasonic powder means the number average particle diameter of the powder measured using a particle size analyzer after ultrasonication. The support includes a multilayer support.

Particularly, the supported catalyst for CNT synthesis prepared by the method is preferably spherical in shape when its specific surface area is taken into consideration. In the Examples section that follows, supported catalysts for CNT synthesis were prepared and they were also found to be completely spherical, almost spherical or substantially close to a spherical shape.

There is no restriction on the production of CNTs using the supported catalyst. For example, CNTs may be produced by the following procedure. First, the supported catalyst is fed into a reactor. Then, a carbon source, and optionally hydrogen gas, nitrogen gas or a mixed gas thereof, is injected into the reactor at a temperature of 650° C. to less than 800° C. The injected carbon source is decomposed on the surface of the catalyst to grow carbon nanotubes thereon.

According to one embodiment, the reactor may be a fixed bed reactor or fluidized bed reactor but is not limited thereto.

The use of the supported catalyst in the CNT production method and the reaction temperature of 650° C. to less than 800° C. contribute to a reduction in the specific surface area of final CNTs while minimizing the formation of amorphous carbon. The reduced specific surface area leads to an increase in the diameter of the CNTs. In addition, the yield of the CNTs is lowered while maintaining the bulk size of the CNTs unchanged, and as a result, the bulk density of the CNTs is lowered. The low bulk density ensures improved dispersibility of the CNTs.

The CNTs thus produced has an entangled type secondary structure, a spherical bulk shape, a large diameter (i.e. a low BET specific surface area), and a low bulk density, as demonstrated in the Examples section that follows.

The CNTs may have a particle diameter or average particle diameter of 100 to 800 μm and a strand diameter of 10 to 50 nm. The CNTs may be of potato-like or spherical entangled type that has a BET specific surface area of 40 $m^2/g$ to 120 $m^2/g$, a bulk density of 60 $kg/m^3$ or less or 20 $kg/m^3$ to 60 $kg/m^3$, an aspect ratio of 0.9 to 1.0, and a particle size distribution (Dcnt) of 0.5 to 1.0.

The specific surface area of the CNTs is measured by the BET method. Specifically, the specific surface area of the CNTs is calculated by measuring the amount of nitrogen gas adsorbed at the temperature of liquid nitrogen (77 K) using BELSORP-mini II (BEL Japan).

The term "bulk density" used herein is defined by Expression 1:

$$\text{Bulk density} = \text{CNT weight (kg)}/\text{CNT volume } (m^3) \quad \text{[Expression 1]}$$

The controlled calcination temperature for the preparation of the supported catalyst and the increased reaction temperature for CNT synthesis allow the CNTs grown on the supported catalyst to have a specific density distribution.

The aspect ratio and bundle type of the CNTs can be obtained by the use of the supported catalyst. The aspect ratio is defined by Expression 2:

Aspect ratio=the shortest diameter passing through the center of CNT/the longest diameter passing through the center of CNT  [Expression 2]

The particle size distribution (Dcnt) can be defined by Expression 3:

$$Dcnt=[Dn90-Dn10]/Dn50 \quad \text{[Expression 3]}$$

where Dn90, Dn10, and Dn50 are the number average particle diameters of the CNTs after standing in distilled water for 3 hours, as measured under 90%, 10%, and 50% in the absorption mode using a particle size analyzer (Microtrac), respectively.

The CNTs of the present invention can be used as raw materials in electrical, electronic, and energy applications. The CNTs of the present invention can also find applications as reinforcing materials in the field of plastics.

The following examples are provided to assist in understanding the invention. However, it will be obvious to those skilled in the art that these examples are merely illustrative and various modifications and changes are possible without departing from the scope and spirit of the invention. Accordingly, it should be understood that such modifications and changes are encompassed within the scope of the appended claims.

Examples 1-4 and Comparative Examples 1-4

<Preparation of CNT Catalysts>

$Fe(NO_3)_2 \cdot 9H_2O$, $Co(NO_3)_2 \cdot 6H_2O$, $(NH_4)_6Mo_7O_{24}$, and $NH_4VO_3$ as catalytic metal precursors were completely dissolved in 15.0 ml of distilled water in flask A. The amounts of the catalytic metal precursors used are shown in Table 1. The solution in flask A was added to flask B containing 12.5 mg of spherical $\alpha$-$Al_2O_3$ (pore volume: 0.01 cm$^3$/g, BET specific surface area: 4.9 m$^2$/g, Saint Gobain) as a support (Examples 1-4 and Comparative Examples 1-3). In Comparative Example 4, $\gamma$-$Al_2O_3$ (pore volume: 0.55 cm$^3$/g, BET specific surface area: 185 m$^2$/g, Saint Gobain) was used instead of $\alpha$-$Al_2O_3$. The catalyst metal precursors were allowed to be supported on the support, followed by aging with stirring for 15 h in a thermostatic reactor equipped with a reflux condenser at 100° C.

The aged mixture was dried on a rotary evaporator (150 mbar) at 100 rpm in a thermostatic bath at 60° C. for 30 min and 15 ml of ethanol was added thereto. After mixing/dispersion at 100 rpm, the dispersion was dried. This drying procedure was repeated a total of two times. The dried mixture was preliminarily calcined at 350° C. and calcined under the temperature and atmosphere conditions shown in Table 3 to produce a homogeneous supported catalyst. The dried catalyst was in the form of spherical granules.

TABLE 1

| | | Metal precursors (mg) | | | |
|---|---|---|---|---|---|
| | Support (mg) | $Fe(NO_3)_2 \cdot 9H_2O$ | $Co(NO_3)_2 \cdot 6H_2O$ | $(NH_4)_6Mo_7O_{24}$ | $NH_4VO_3$ |
| Examples 1-4 | Spherical $\alpha$-$Al_2O_3$ (12.5) | 2.391 | 7.341 | 0.552 | 0.344 |
| Comparative Examples 1-3 | Spherical $\alpha$-$Al_2O_3$ (12.5) | 2.391 | 7.341 | 0.552 | 0.344 |
| Comparative Example 4 | $\gamma$-$Al_2O_3$ (12.5) | 3.984 | 12.234 | 0.920 | 0.574 |

The metal contents of the supported catalysts prepared in Examples 1-4 and Comparative Examples 1-4 are described in Table 2.

TABLE 2

| | Support | Metal contents | | | | Total metal content | |
|---|---|---|---|---|---|---|---|
| | (parts by weight) | (parts by weight) | | | | Parts by weight | % by weight |
| | | Fe | Co | Mo | V | | |
| Examples 1-4 | Spherical $\alpha$-$Al_2O_3$ (100) | 2.6 | 11.9 | 2.4 | 1.2 | 18.1 | 15.3 |
| Comparative Examples 1-3 | Spherical $\alpha$-$Al_2O_3$ (100) | 2.6 | 11.9 | 2.4 | 1.2 | 18.1 | 15.3 |
| Comparative Example 4 | $\gamma$-$Al_2O_3$ (100) | 4.4 | 19.8 | 4.0 | 2.0 | 30.2 | 23.2 |

TABLE 3

| | Calcination atmosphere | Calcination temperature (° C.) |
|---|---|---|
| Comparative Example 1 | Air | 680 |
| Comparative Example 2 | | 660 |
| Comparative Example 3 | | 620 |
| Example 1 | | 600 |
| Example 2 | | 400 |
| Example 3 | Nitrogen | 600 |
| Example 4 | | 400 |
| Comparative Example 4 | Air | 715 |

Production Example 1: Production of CNTs

In this example, carbon nanotubes were synthesized using each of the catalysts prepared in Examples 1-4 and Comparative Examples 1-3 in a fixed bed reactor on a laboratory scale. Specifically, each catalyst was mounted at the center of a quartz tube having an inner diameter of 55 mm and heated to 650° C. under a nitrogen atmosphere. Hydrogen gas was allowed to flow at a rate of 60 sccm for 2 h while maintaining the same temperature, affording a carbon nanotube aggregate. The yield, bulk density, and specific surface area of the CNT aggregate are shown in Table 4.

TABLE 4

| | Calcination temperature (° C.) | Yield (g of CNTs/ g of catalyst) | Bulk density (kg/m$^3$) | BET specific surface area (m$^2$/g) |
|---|---|---|---|---|
| Comparative Example 1 | 680 | 73 | 114 | 202 |
| Comparative Example 2 | 660 | 60 | 112 | 175 |

TABLE 4-continued

| | Calcination temperature (° C.) | Yield (g of CNTs/ g of catalyst) | Bulk density (kg/m³) | BET specific surface area (m²/g) |
|---|---|---|---|---|
| Comparative Example 3 | 620 | 51 | 110 | 145 |
| Example 1 | 600 | 27 | 58 | 117 |
| Example 2 | 400 | 19 | 32 | 96 |
| Example 3 | 600 | 22 | 36 | 103 |
| Example 4 | 400 | 20 | 31 | 96 |

As can be seen from the results in Table 4, the specific surface areas of the CNTs produced using the supported catalysts prepared by calcination at temperatures of 600° C. or less were reduced to 40-120 m²/g, indicating increased diameters of the CNTs. The bulk density of the CNTs was decreased to below 60 kg/m³ with decreasing calcination temperature.

Figure 11:
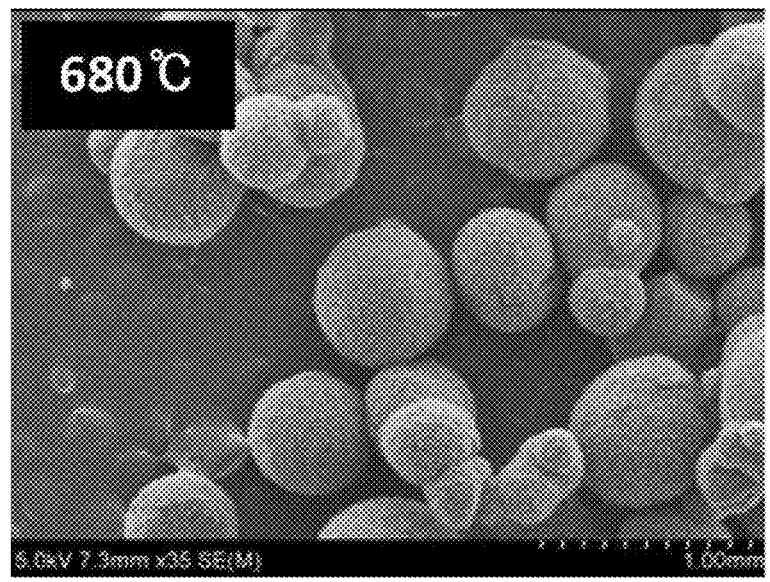
FIGS. 11 and 12 show low magnification (35×) SEM images of CNTs produced using supported catalysts obtained in Comparative Example 1 and Example 2, respectively.
Figure 12:
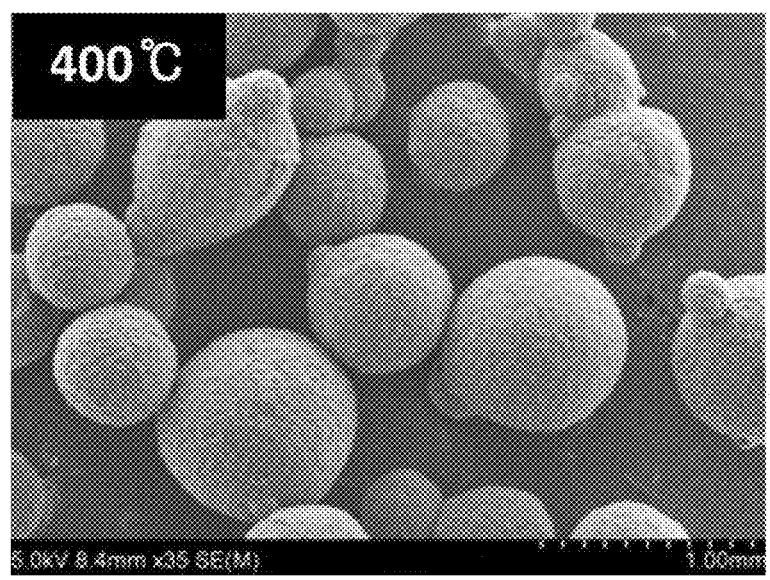

FIGS. 1 to 5 show high magnification (100,000×) SEM images of the CNTs produced using the catalysts obtained in Comparative Examples 1 to 3 and Examples 1 and 2, respectively. FIGS. 6 to 10 show medium magnification (1,000×) SEM images of the CNTs produced using the catalysts obtained in Comparative Examples 1 to 3 and Examples 1 and 2, respectively. FIGS. 11 and 12 show low magnification (35×) SEM images of the CNTs produced using the catalysts obtained in Comparative Example 1 and Example 2, respectively.

These images reveal that as the calcination temperature decreased, the diameter of the CNTs tended to increase and the secondary structures of the CNTs were converted from bundle to entangled type. It was also revealed that as the calcination temperature decreased, the yield of the CNTs was lowered while maintaining the bulk size of the CNTs unchanged, indicating low bulk density of the CNTs.

Production Example 2: Production of CNTs

CNTs were produced in the same manner as in Production Example 1, except that the supported catalysts obtained in Example 1 and Comparative Example 4 were used, the reaction temperature of the reactor was changed as shown in Table 5, and the reaction time was changed to 3 h. The yields and specific surface areas of the CNTs are described in Table 5.

TABLE 5

| | Supported catalyst | Reaction temperature (° C.) | Yield (g of CNTs/ g of catalyst) | BET specific surface area (m²/g) |
|---|---|---|---|---|
| Example 1-1 | Example 1 | 800 | 5 | 25 |
| Example 1-2 | | 750 | 13 | 65 |
| Example 1-3 | | 700 | 12 | 81 |
| Example 1-4 | | 650 | 27 | 117 |
| Comparative Example 4-1 | Comparative Example 4 | 800 | 15 | 35 |
| Comparative Example 4-2 | | 750 | 73 | 178 |
| Comparative Example 4-3 | | 700 | 87 | 184 |
| Comparative Example 4-4 | | 650 | 42 | 218 |

As can be seen from the results in Table 5, as the reaction temperature increased, the specific surface area of the CNTs was decreased, indicating increased diameter of the CNTs.

Figure 13:
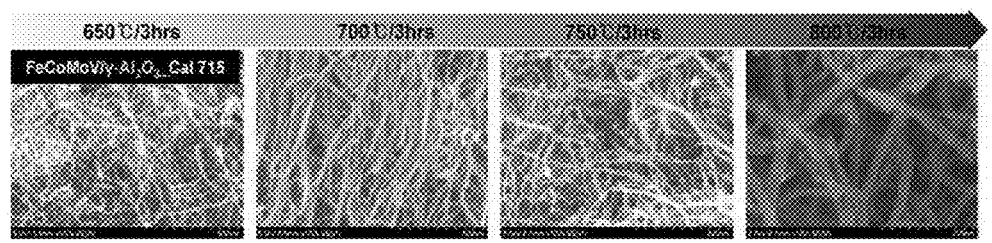
FIG. 13 shows SEM images at a magnification of 100,000× of CNTs produced in Examples 1-1 to 1-4.
Figure 14:
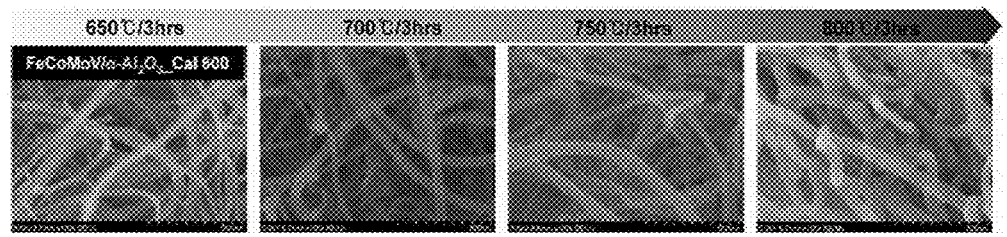
FIG. 14 shows SEM images at a magnification of 100,000× of CNTs produced in Comparative Examples 4-1 to 4-4.

FIG. 13 shows SEM images of the CNTs produced in Examples 1-1 to 1-4 and FIG. 14 shows SEM images the CNTs produced in Comparative Examples 4-1 to 4-4.

Referring to FIG. 14, when γ-alumina was used as a support, no changes in the diameter of the CNTs were observed until the CVD reaction temperature reached 750° C. and a sudden change in diameter was observed at 800° C. In contrast, when α-alumina was used (FIG. 13), the diameter of the CNTs was dependent on the calcination temperature for the preparation of the supported catalyst. The diameter of the CNTs was large even at a low CVD reaction temperature and tended to gradually increase with increasing CVD reaction temperature.

Figure 15:
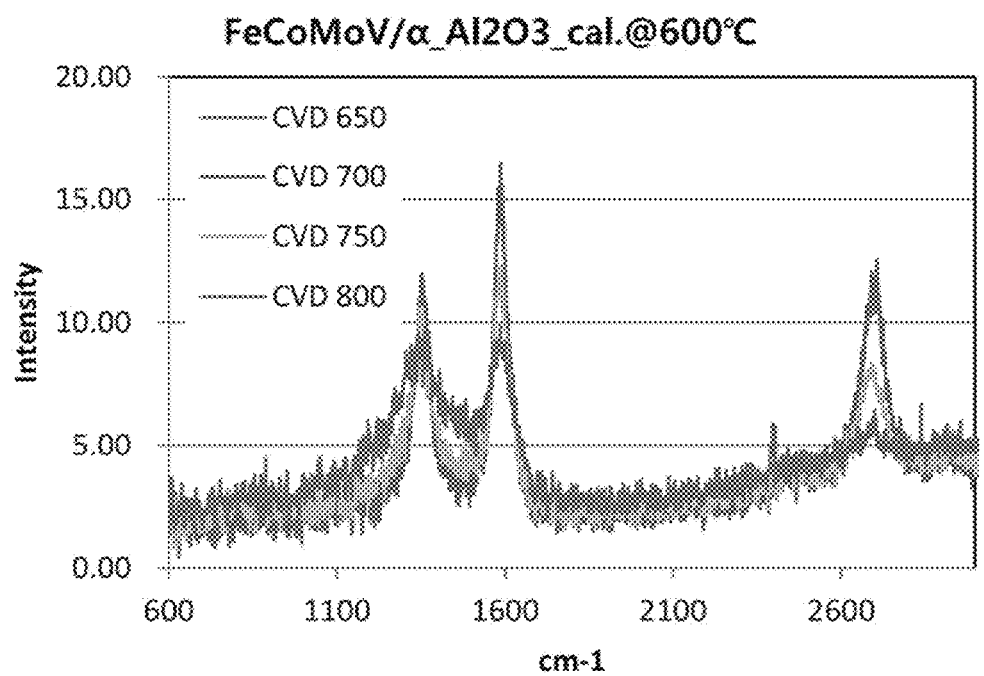
FIG. 15 shows Raman spectra of CNTs produced in Examples 1-1 to 1-4.

The crystallinities of the CNTs produced in Examples 1-1 to 1-4 were analyzed by Raman spectroscopy. The results are shown in FIG. 15. Raman spectra of the CNTs produced in Comparative Examples 4-1 to 4-4 are shown in FIG. 16.

Figure 16:
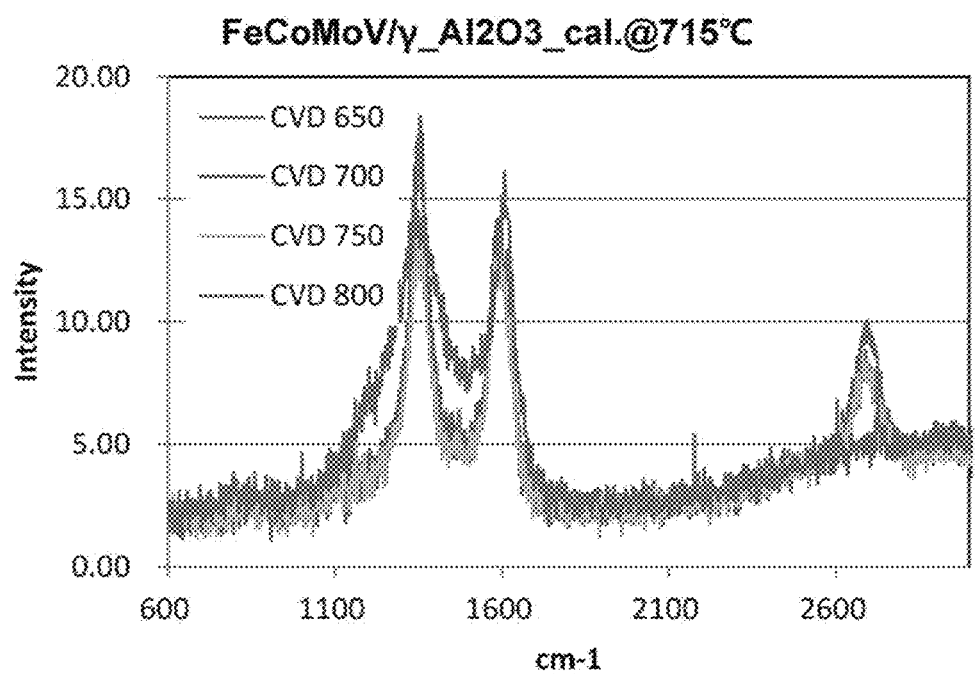
FIG. 16 shows Raman spectra of CNTs produced in Comparative Examples 4-1 to 4-4.

FIG. 16 reveals that D-peak (1350 cm$^{-1}$) of the CNTs tended to be broad because amorphous carbon was coated on the supported catalyst using γ-alumina as a support at a CVD reaction temperature of 800° C. In contrast, even the CNTs produced at ≤700° C. in the presence of the supported catalyst using α-alumina as a support did not have broad D-peak despite their large diameters, indicating improved crystallinity of the CNTs (FIG. 15).

What is claimed is:

1. A method for producing carbon nanotubes comprising:
preparing a supported catalyst by combining a spherical α-alumina support having a pore volume of 0.001-0.1 cm³/g with a catalytic component and an active component, and calcining the combined support, catalytic and active components at a temperature of 600° C. or less to form the supported catalyst;
feeding the supported catalyst into a reactor;
injecting a carbon source and optionally hydrogen gas, nitrogen gas or a mixed gas thereof into the reactor at a temperature of 650° C. to less than 800° C.; and
decomposing the injected carbon source on the surface of the supported catalyst to grow carbon nanotubes on the supported catalyst having a strand diameter of 10-50 nm, a BET specific surface area of 40 m²/g to 120 m²/g and a bulk density not higher than 60 kg/m³.

2. The method according to claim 1, wherein the calcination temperature is between 400° C. and 600° C.

3. The method according to claim 1, wherein the catalytic component and the active component are supported in a total amount of 10 to 25 parts by weight, based on 100 parts by weight of the spherical α-alumina.

4. The method according to claim 1, wherein the catalytic component and the active component are in a weight ratio of 10-30:1-14.

5. The method according to claim 1, wherein the catalytic component comprises at least one metal selected from the group consisting of Fe, Co, and Ni.

6. The method according to claim 1, wherein the active component comprises at least one metal selected from Mo and V.

7. The method according to claim 1, wherein the supported catalyst is prepared by an impregnation method.

8. The method according to claim 1, wherein the supported catalyst contains 5% or less of an ultrasonic powder.

9. The method according to claim 1, wherein the step of preparing the supported catalyst further comprises (1) mixing the spherical α-alumina support with an aqueous metal solution comprising a catalytic component precursor and an active component precursor to prepare an aqueous solution containing the supported catalyst precursors, (2) aging the aqueous solution and impregnating the catalytic component precursor and the active component precursor into the support to obtain a mixture, (3) drying the mixture under vacuum to coat the catalytic component and the active component on the surface of the support, and (4) calcining the vacuum-coated support at a temperature of 600° C. or less.

10. The method according to claim 9, wherein the aqueous metal solution has a concentration of 0.1 to 0.4 g/ml.

11. The method according to claim 9, wherein the aging/impregnation is performed at a temperature of 20° C. to 100° C. for 30 minutes to 15 hours.

12. The method according to claim 9, wherein the vacuum drying is performed at 45° C. to 80° C. for 1 minute to 1 hour.

13. The method according to claim 9, further comprising preliminarily calcining the vacuum-dried mixture at 250 to 400° C. once or more before the calcination.

14. The method according to claim 9, wherein the reactor is a fixed bed reactor or fluidized bed reactor.

15. The method according to claim 1, wherein the catalytic component comprises Fe and Co, and the active component comprises Mo and V.

* * * * *